United States Patent [19]
Nishino

[11] Patent Number: 4,520,982
[45] Date of Patent: Jun. 4, 1985

[54] SLIDE ADJUSTMENT APPARATUS
[75] Inventor: Takaichi Nishino, Tokyo, Japan
[73] Assignee: Tachikawa Spring Co., Ltd., Tokyo, Japan
[21] Appl. No.: 458,150
[22] Filed: Jan. 14, 1983
[30] Foreign Application Priority Data Jan. 29, 1982 [JP] Japan .................. 57-11721

[51] Int. Cl.³ .............................................. B60N 1/08
[52] U.S. Cl. ................................................. 248/430
[58] Field of Search ................ 248/430, 429, 424; 308/6 R, 3.8, 3.6; 312/233, 234, 237, 341 R

[56] References Cited
U.S. PATENT DOCUMENTS

| 3,450,425 | 6/1969 | Leonhardt | 248/430 |
| 3,848,937 | 11/1974 | Harder | 248/429 |
| 3,926,397 | 12/1975 | Hunwicks | 248/430 |
| 4,196,943 | 4/1980 | Rock | 308/3.8 |
| 4,225,177 | 9/1980 | Kluting | 248/429 |
| 4,252,382 | 2/1981 | Thomas | 308/3.8 |
| 4,305,625 | 12/1981 | Gutner | 308/3.8 |
| 4,351,575 | 9/1982 | Rock | 308/3.8 |

Primary Examiner—Reinaldo P. Machado
Assistant Examiner—Alvin Chin-Shue
Attorney, Agent, or Firm—Sandler & Greenblum

[57] ABSTRACT

A slide adjustment device for use in a seat of a moving vehicle such as an automobile or airplane. The device includes a lower rail adapted to be attached to the floor of the vehicle, an upper rail to be attached to the seat, and slidably moveable with regard to the lower rail. A sliding element is provided which slides relative to the rails and is provided between the upper and lower rails.

2 Claims, 11 Drawing Figures

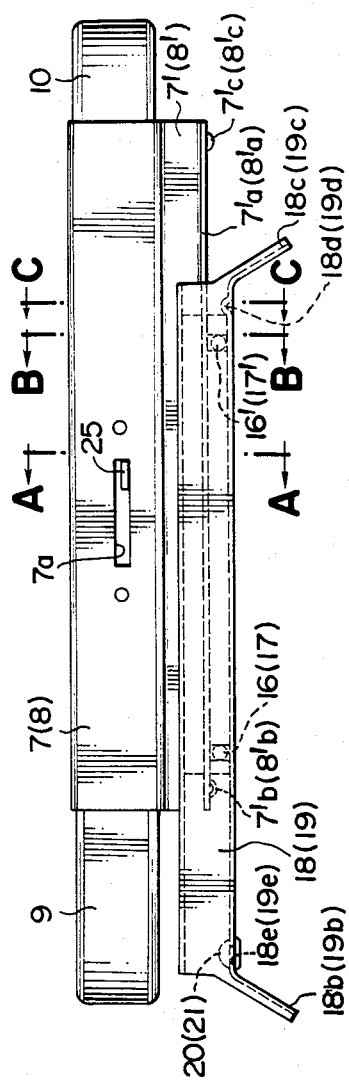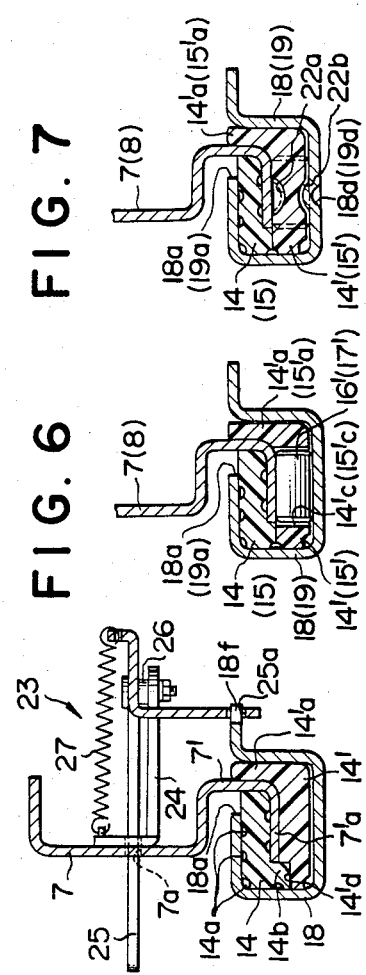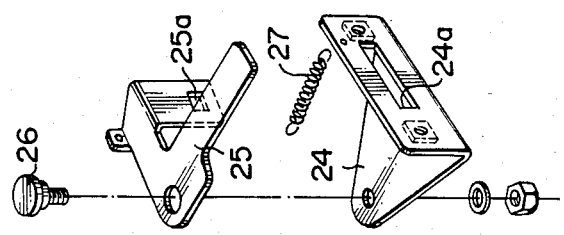

SLIDE ADJUSTMENT APPARATUS

BACKGROUND OF THE INVENTION

1. Field of the Invention

The present invention relates to an improved slide adjustment apparatus for adjusting the forward and backward sliding movement of seats used in vehicles, airplanes and the like.

2. Description of the Prior Art

A cushioned seat, particularly a driver's seat, for vehicles or airplanes and the like, can be slid forward and backward while the back of that seat can be adjustably inclined so as to change seating posture. To enable such adjustable movement, a cushion frame of the cushioned seat, upon which the driver sits, is provided with a movable rail constituting a slide adjustment apparatus and with a reclining device for adjusting inclining movement. The back of the seat includes a frame that is fixed to the cushion frame through the reclining device.

Consequently, load applied from the back frame is transferred through the reclining device to the cushion frame, and further to the slide adjustment apparatus. Thus, since each of the elements constituting the seat is required to be strong enough to support the applied load, the weight of the entire seat is limited as to how light it can be. Each of the back frame, cushion frame, reclining device, and slide adjustment apparatus must be built to handle any applied load.

SUMMARY OF THE INVENTION

The slide adjustment apparatus of the present invention eliminates the drawbacks of the conventional heavy structure.

Accordingly, the principal object of the invention is to provide a cushioned seat used for vehicles or airplanes, wherein its frame parts, and connecting members, are lightened in weight and wherein its slide adjustment capability is improved.

In order to achieve the above objectives, a novel slide adjustment apparatus is provided which includes a sliding element, made preferably of synthetic resin material but which may be made of any wear resistant material, positioned between a lower rail adapted to be fixed to the floor, and an upper rail connected to a frame of the cushioned seat. Using this improved structure the load delivered from the back frame through the reclining device is supported or borne directly by the sliding element and is transmitted directly thereto. Consequently, since the upper rail and the cushion frame must be strong enough only to support the weight of the driver, or whoever occupies the seat in question, they can be made of thinner and lighter materials, thus lightening the overall weight of the seat.

More specifically, it is an object of the present invention to provide a slide adjustment device for adjusting the forward and backward sliding movement of seats used in an apparatus capable of movement, such as an automobile or airplane, which device includes a lower rail adapted to be attached to the floor of the apparatus, an upper rail adapted to be attached to a frame of the seat, and slidably movable with regard to the lower rail. A sliding element adapted to slide relative to the rails is provided essentially between the lower and upper rails.

According to an additional aspect of the invention, a plurality of rolling members or rollers are rotatably positioned at least partially within the sliding element, and wherein the upper rail is slidably movable within the lower rail.

It is a further object of this invention to form the lower portion of the upper rail as a substantially horizontal flange. In this embodiment the rolling members rotatably contact the lower flange at the lower surface thereof and the rolling members also contact the lower rail.

According to yet another aspect of the invention the adjustable locking mechanism may be secured to the frame of the seat to lock the seat in a desired fixed position. The upper rail is of generally U-shaped cross-section, with the flange of the upper rail being one leg of the U-shape. The lower rail is of generally rectangular construction in cross-section. Rolling members within the sliding element rotatably contact an inner lower surface of the generally rectangular construction.

It is a further object of this invention to provide for the length of the sliding element as being substantially the same as the lower and upper rails, and the upper rails are attached to the side frames of the cushioned seat.

A further object of the invention provides for the sliding element including an upper slider, secured above and in contact with the lower flange of the upper rail, and a lower slider located below the flange and connected to the upper slider, and wherein the rolling members are located within said lower slider.

A further object of this invention provides for rolling members located within the sliding member, which sliding member is so constructed to provide for a first group of rolling members to rotatably contact both the upper surface of the upper rail, and an inner upper portion of the top of the rectangular construction of the lower rail; and also a second group of rolling members to rotatably contact both the lower surface of the flange and the inner lower face of the lower rail.

A further object of the invention provides for sliding elements of wear resistant material, such as a suitable synthetic resin material.

BRIEF DESCRIPTION OF THE DRAWINGS

The invention is explained with reference to the drawings illustrating preferred embodiments of the invention.

FIG. 3 is an analytical perspective view of a portion of the adjustable locking mechanism of said first embodiment;

FIG. 4 is a side view of FIG. 2 of the cushion frame;

FIG. 5 is an enlarged sectional view along the line A—A of FIG. 4;

FIG. 6 is a view along the line B—B of FIG. 4;

FIG. 7 is a view along the line C—C of FIG. 4;

DESCRIPTION OF PREFERRED EMBODIMENTS OF THE INVENTION

Figure 1:
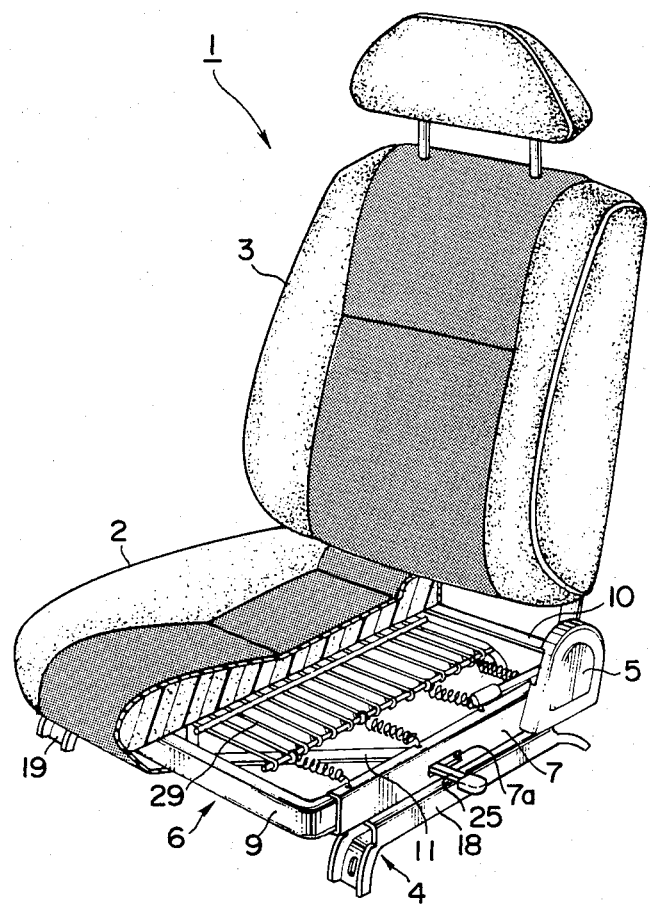
FIG. 1 is a perspective view, partially in section, of the seat for vehicles or the like for which the apparatus of the invention is used.

In FIG. 1, reference 1 indicates generally a seat for vehicles or the like with which the apparatus of the invention is used. Seat 1 includes cushioned seat 2, a back 3 of the cushioned seat, a slide adjustment apparatus 4 and a reclining device 5.

Figure 2:
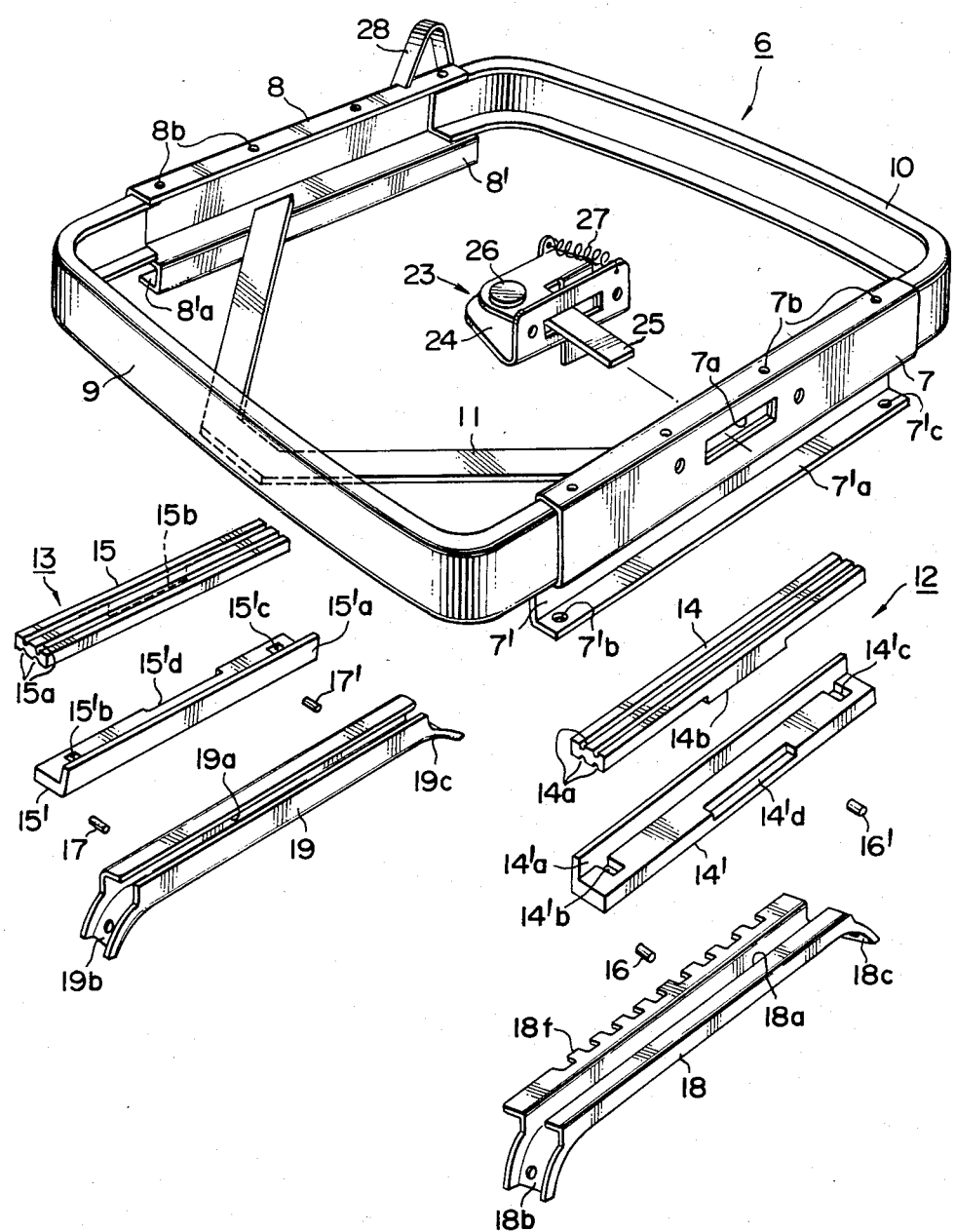
FIG. 2 is an analytical perspective view of a cushion frame of a first embodiment of the slide adjustment apparatus.

The cushion frame 6 of the cushioned seat 2 includes, as clearly seen in FIG. 2, side frame portions 7 and 8 which act also as movable rails, with regard to the floor of the apparatus, of slide adjustment apparatus 4, and front and rear frames 9 and 10 connected in a rectangular configuration. Further, a V-shaped reinforcing member 11 is provided extending between side frames 7 and 8 and front frame 9.

The lower portions of side frames 7 and 8 have secured thereto upper rails 7' and 8', which are generally U-shaped in cross-section. Rails 7' and 8' face symmetrically to each other. Lower flanges 7'a and 8'a of the rails are provided with embossed nipples 7'b, 7'c, and as shown in FIG. 4, 8'b and 8'c, respectively, which project downwardly.

Between embossed nipples 7'b and 7'c, and between embossed nipples 8'b and 8'c are placed slide bodies or sliding elements 12 and 13, comprising upper and lower sliders 14, 14' and 15, 15', and also front and rear rollers, or rolling members 16, 16' and 17, 17'. Upper sliders 14 and 15 are provided with a plurality of grooves 14a and 15a respectively, while the lower sliders 14' and 15' have projected edges 14'a and 15'a respectively at their upper inner portions. Further, the lower sliders have holes 14'b, 14'c, 15'b, and 15'c, extending completely therethrough at their front and rear end portions. The appropriate rotatably provided rollers or rolling members 16, 16', 17, and 17' are positioned in these holees. Upper sliders 14 and 15 have projections 14b and 15b respectively while the lower sliders have corresponding recesses 14'd and 15'd respectively. The sliding elements may be made of any suitable strong material, preferably a synthetic resin.

Upper and lower sliders 14, 14' and 15, 15' are located on the lower substantially horizontal flanges 7'a and 8'a of the upper rails 7' and 8', as shown in FIG. 4, and slidably ride on said flanges. In positioning the sliders, projections 14b and 15b of the upper sliders are set into recesses 14'd and 15'd respectively of the lower sliders. Fixing of the upper and lower sliders to each other may be effected by the use of adhesives. Alternatively, the sliders may be formed integrally. Then upper rails 7' and 8', to which sliders are thus provided, are slidably movable within lower rails 18 and 19 respectively as illustrated in FIGS. 5-7. The lower rails, which are of generally rectangular shape, have integral leg pieces 18b, 18c, 19b, 19c and spacing members 18a and 19a. Further, the lower rails have embossed nipples 18d and 19e (FIG. 4) at their front edges. Thus, rollers or rolling members 16, 16', 17, 17' set within lower sliders 14' and 15', contact the lower surface of lower flanges 7'a and 8'a of upper rails 7' and 8', and the lower surface of lower rails 18 and 19. In this way, sliders 14, 14', 15, 15' are placed within rails 18 and 19. Pins 20 and 21 are inserted into holes 18e and 19e, as shown in FIG. 4, so that slide bodies or sliding elements 12 and 13 will not be dropped or disengaged by excessive forward movement thereof, and the relative movement of slide bodies 12 and 13, that is upper and lower sliders 14, 14', 15, 15', and upper rails 7' and 8' and lower rails 18 and 19 is carried out in the distance between embossed nipples 7'b and 7'c, 8'b and 8'c of upper rails 7' and 8', and between embossed nipples 18d and 19d of lower rails 18 and 19 and pins 20 and 21 of the lower rails.

Excessive movement of the sliders is stopped since the ends of lower sliders 14', 15' collide against the embossed nipples or pins. If collision occurs frequently, the ends of the sliders will be damaged. Therefore, as will be seen in FIG. 7, escape grooves 22a and 22b are formed in the lower and upper surfaces of the lower sliders 14' and 15'. Thus, since rollers 16, 16', 17, 17' collide directly against embossed nipples and pins, damage of the lower sliders 14' and 15' will be reduced.

Further, an adjusting locking device is provided between one side frame 7 and the lower rail 18, for adjusting the moving distance. That is, the upper inner end of lower rail 18 is provided with teeth 18f which are locked by the locking device 23. The device has a bracket 24 to which an L-shaped lever 25 is fixed by a pin 26. The lever has a rectangular hole 25a engaging with teeth 18f of the rail 18. The area surrounding hole 25a is pressed constantly by spring 27 so as to engage with teeth 18f, with one of the teeth selectively inserted within the hole.

The end portion of the lever 25 projects through a window 24a formed in the bracket 24 and through a window 7a of side frame 7. Rectangular hole 25a engages with teeth 18f of lower rail 18. It should be readily apparent that inward pressure of lever 25, as shown in FIG. 1, toward the seat will disengage the locking device, and release thereof will allow spring 27 to renew locking.

A reclining device 5 is fixed to the rear portion of one side frame 7, while a free hinge 28 for the back 3 is fixed to the other side frame 8. Further, holes 7b, 8b are provided in the upper surface of said frames 7 and 8 so as to support the padding spring 29.

According to the embodiment mentioned above, since upper rails for the slide adjustment apparatus are formed integrally with the side frames of the cushion frame, no additional fixing members are necessary to connect the cushion frame within the upper rails.

Further, rollers are rotatably provided at front and rear portions of the sliders, which sliders are therefore movable within upper and lower rails. Therefore, loads applied to the rails are supported by the rollers. Consequently, since a varied load does not affect the relative movement between each of the rails, operating performance is greatly improved and, thus, the seat position adjustment made can be carried out smoothly and swiftly.

It will be appreciated that the sliding elements, each including lower and upper sliders, are not restricted from movement along the upper and lower rails, except at their terminal sliding points, which points prevent disengagement. In other words, their movement is independent of the particular location of the respective rails or movement of the upper rail. While the lower sliders contain rollers therein for easy movement, the upper sliders connected to the lower sliders are provided with multiple grooves 14a and 15a for easy movement of sliding contact on top of flange 7'a, in FIG. 4 for example, and beneath spacing member 18a (see also FIG. 2).

FIGS. 8-11 illustrate a second embodiment of the invention, wherein a plurality of rolling members, namely upper and lower members, are provided within sliding elements, so that the sliding elements slide along two surfaces of each of the lower and upper rails.

Figure 8:
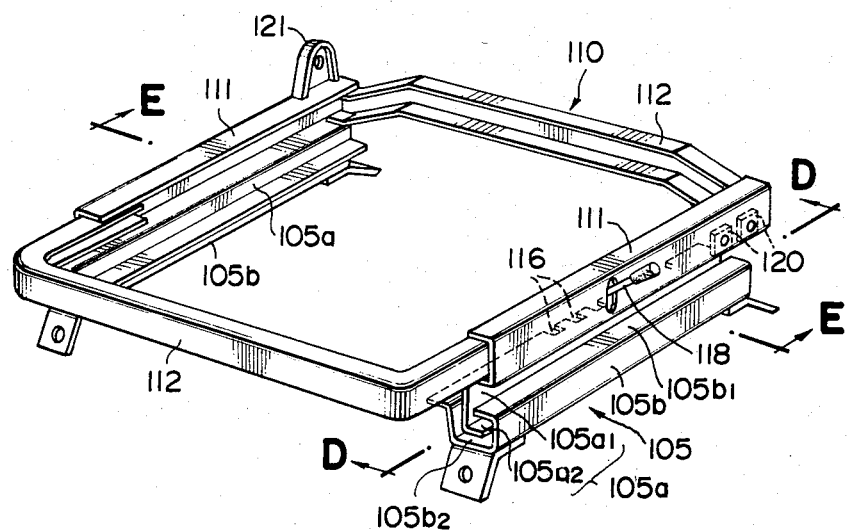
FIG. 8 is a perspective view of a cushion frame according to a second embodiment of the invention.
Figure 9:
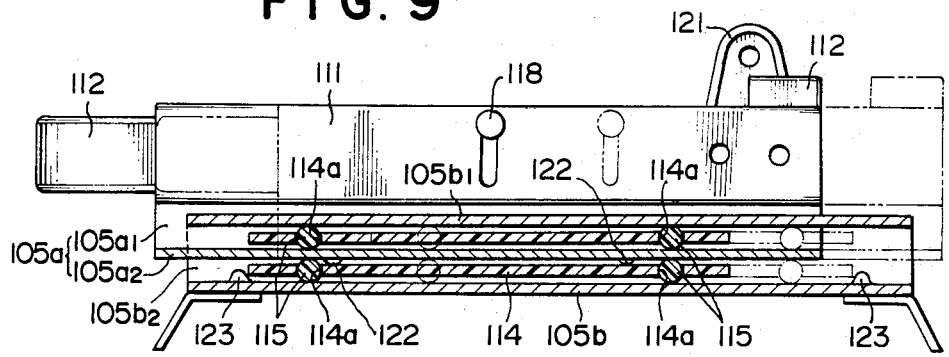
FIG. 9 is an enlarged sectional view along the line D—D of FIG. 8.
Figure 10:
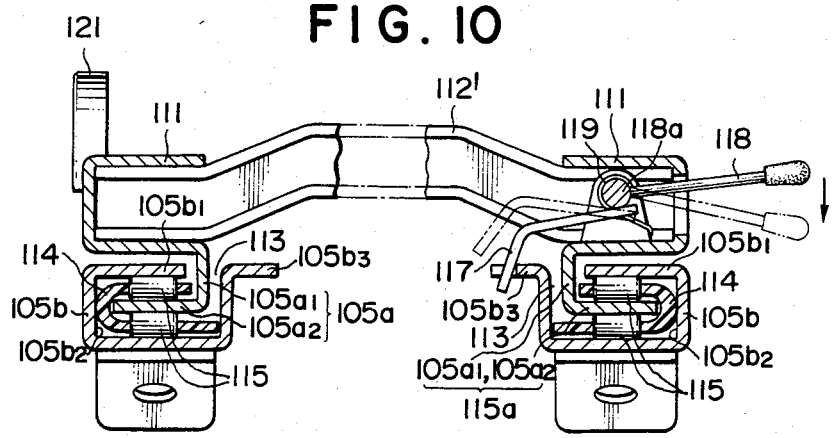
FIG. 10 is a view along the line E—E of FIG. 8.
Figure 11:
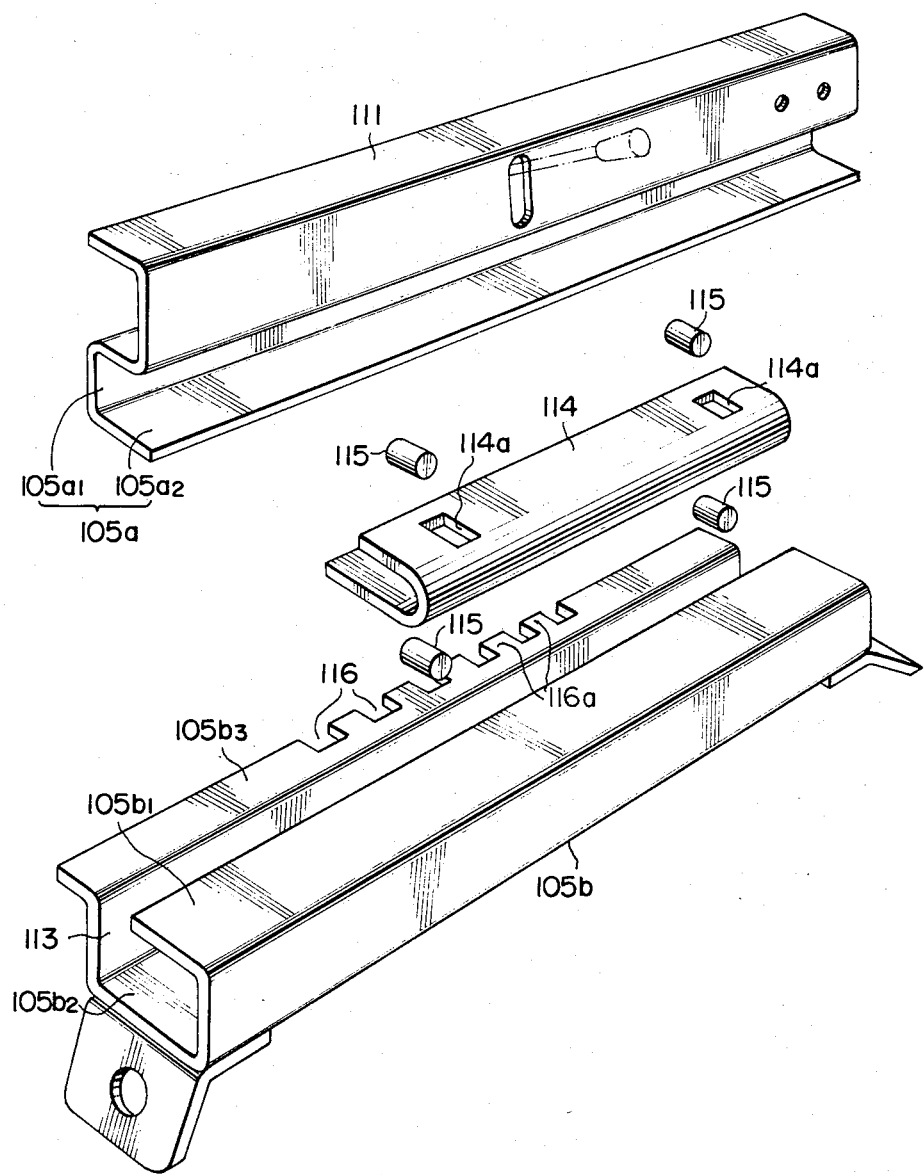
FIG. 11 is an analytical perspective view of the slide adjustment apparatus of the second embodiment of the invention.

FIG. 8 illustrates a cushion frame for a seat cushion. Frame 110 consists of left and right frames 111, and front and rear frames 112 welded to each other. The L-shaped lower part of the side frame 111 is formed of upper rail 105a, of slide apparatus 105. A rectangular lower rail 105b of the apparatus 105 is formed such that insert groove 113 may be provided along the inner portion of their upper surface 105b1. Vertical part 105a1 is inserted into groove 113, so that a horizontal part 105a2 may be positioned within a hollow part 105b2. Sliding element 114 is placed between the horizontal 105a2 of upper rail 105a, and the hollow part 105b2 of lower rail 105b. The sliding element 114, preferably of wear resistant material having sliding properties, such as JURACON, is generally L-shaped or U-shaped and fills the space between horizontal part 105a2 of the upper rail and hollow part 105b of the lower rail, and slidably contacts ends of horizontal part 105b2 and hollow part 105b2. Further, the sliding element 114 is provided with openings 114a at front and rear positions thereof (see also FIG. 9), so that rolling members 115, such as rollers or balls, are placed therein in a manner projecting therefrom. Thus, the rolling members rotatably contact horizontal part 105a2 of the upper rail and hollow part 105b2 of the lower rail. A sliding element 114 is situated between an upper and lower rail on both sides of the cushion frame.

Folded part 105b3 of one lower rail 105b is provided with teeth 116 while side frame 111, facing this lower rail 105b, is provided with lock piece 117 which can be operated by lever 118 so as to engage teeth 116. Bearing position 118a of the lever 118 is provided with spring 119 so that lock piece 117 may constantly engage with holes 116d located between the teeth.

One side frame 111 is provided with a fixing nut 120 (FIG. 8) for a reclining device, while the upper surface of the other side frame is provided with a hinge bracket 121 for a back frame (not shown).

Reference numbers 122 and 123 (FIG. 9) indicate multiple projections of each, provided on the horizontal part 105a2 of the upper rail and the hollow part 105b2 of the lower rail respectively, which rolling members 115 and the sliding elements 114 contact, so as to limit the operating area of the rails.

The slide adjusting device, constructed as mentioned above, operates as follows. When lever 118 is pushed downwardly to the direction shown in the arrow in FIG. 10, locking piece 117 rotates outwardly so as to release from the holes surrounding teeth 116 of lower rail 105b, and thus, the cushion frame 110 is in a position to slide freely from the lower rail 105b. That is, the upper rail slides on the lower rail by the rolling movement of the sliding elements 114 and the rolling members 115. Accordingly, the cushioned seat can move backward or forward. When lever 118 is released at the point the seat cushion moves to a desired position, lock piece 117 is pressed by spring 119 so that it is engaged with the holes surrounding the teeth 116 of the lower rail 105b and thus the seat is locked at a desired position.

According to this embodiment, the lock grooves surrounding the teeth 116 are provided in one lower rail 105b while lock piece 117 is provided in one side frame 111, corresponding to the rail 105b. However, the lock groove may be provided in the other rail as well, and the lock piece may be provided in both side frames, so that the locking movement can be effected at both sides.

Further, although the rail 105a is formed integrally with the side frame 111 of the cushion frame 110, the upper rail may be formed separately so that it may be mounted to a side surface or bottom surface of the cushioned seat after the cushion is fabricated.

As has been explained, sliders are provided between the lower rails fixed to the floor of an automobile or other vehicle, and upper rails provided at the cushioned seat, so that the upper rails can slide with regard to the lower rails, due to the sliding movement of the sliding elements and rollers or rolling members. Therefore, no creak will be caused between upper and lower rails, since they do not contact each other and a smooth position adjustment operation also is realized. This is so particularly since a plurality of rollers or rolling members are positioned effectively between the two rolls by the presence of the sliding elements, they can easily support loads applied from above and thus excellent operating capability and wear resistant properties are retained. In addition, since the structure is simpler and the apparatus is more easily assembled than the conventional rails using rollers and bearings, production costs are greatly reduced.

Although it is understood that the abovedescribed arrangements are the preferred embodiments which represent applications of the present invention. Numerous varied other arrangements can readily be devised without departing from the spirit and scope of the invention.

What is claimed is:

1. A slide adjustment device for adjusting forward and backward sliding movement of vehicle seats, said device comprising a lower rail which is adapted to be attached to a floor of said vehicle, an upper rail which is adapted to be attached to the frame of said seat and which is slidably movable within said lower rail, and a sliding element which is adapted to slide in relation to both of said upper and lower rails and which is positioned substantially between said upper and lower rails, said device further comprising a plurality of rolling members which are rotatably positioned at least partially within said sliding element and which comprise means for causing said sliding element to slide between said rails, each of said roller members being comprised of resin and having a solid cross-sectional area which has a dimension which is less than the width of said sliding element, said rolling members being positioned adjacent front and rear portions of said sliding element, respectively, said upper rail having a lowermost portion which comprises a substantially horizontal flange, a vertical wall, and having a generally U-shaped cross-sectional configuration, said horizontal flange forming one leg of said upper rail, said rolling members rotatably contacting a lower surface of said horizontal flange, said lower rail having a generally rectangular cross-sectional configuration, an inner lower surface, an upper wall having an opening, and a substantially vertical wall, said upper rail flange and at least a portion of said upper rail vertical wall being positioned within said opening, said rolling members also rotatably contacting said inner lower surface and said sliding element contacting said vertical wall, said adjustment device further comprising an adjustable locking mechanism attached to said frame and comprising means for locking said seat in a predetermined fixed position, said upper rail being attached to a side frame portion of said seat.

2. A slide adjustment device for adjusting forward and backward sliding movement of vehicle seats, said device comprising a lower rail which is adapted to be attached to a floor of said vehicle, an upper rail which is adapted to be attached to the frame of said seat and which is slidably movable within said lower rail, and a sliding element which is adapted to slide in relation to both of said upper and lower rails and which is positioned substantially between said upper and lower rails, said device further comprising a plurality of rolling members which are rotatably positioned at least partially within said sliding element and which comprises means for causing said sliding element to slide between said rails, each of said rolling members being comprised of resin and having a solid cross-sectional area which has a dimension which is less than the width of said sliding element, said rolling members being located, respectively, adjacent to front and rear portions of said sliding element, said upper rail having a lowermost portion which comprises a substantially horizontal flange and having a generally U-shaped cross-sectional configuration, said horizontal flange forming one leg of said upper rail, said rolling members rotatably contacting a lower surface of said horizontal flange, said lower rail having a generally rectangular cross-sectional configuration, an inner lower surface, an upper wall having an opening, and a substantially vertical wall, said upper rail flange and at least a portion of said upper rail vertical wall being positioned within said opening, said rolling members also rotatably contacting said inner lower surface and said sliding element contacting said vertical wall, said adjustment device further comprising an adjustable locking mechanism attached to said frame and comprising means for locking said seat in a predetermined fixed position, said upper rail being attached to a side frame portion of said seat, said sliding element comprising an upper slider member which is secured above said horizontal flange and which contacts said flange, and a lower slider member which is positioned below said horizontal flange and connected to said upper slider, said rolling members being positioned within said lower slider.

* * * * *